United States Patent
Ohgitani

(10) Patent No.: US 7,138,978 B2
(45) Date of Patent: Nov. 21, 2006

(54) KEY INPUT DEVICE

(75) Inventor: Kenji Ohgitani, Tamakawa-mura (JP)

(73) Assignee: Polymatech Co., Ltd., Tokyo (JP)

( * ) Notice: Subject to any disclaimer, the term of this patent is extended or adjusted under 35 U.S.C. 154(b) by 335 days.

(21) Appl. No.: 10/426,789

(22) Filed: May 1, 2003

(65) Prior Publication Data

US 2003/0206159 A1    Nov. 6, 2003

(30) Foreign Application Priority Data

May 1, 2002 (JP) ............................. 2002-130069
Jan. 23, 2003 (JP) ............................. 2003-015452

(51) Int. Cl.
G09G 5/00 (2006.01)
(52) U.S. Cl. ...................... 345/156; 345/157; 345/160; 345/169; 455/550; 455/566; 200/6 A
(58) Field of Classification Search ................ 345/169, 345/172, 156–160, 170; 455/566, 550, 575.1; 200/6 A, 4, 5 R
See application file for complete search history.

(56) References Cited

U.S. PATENT DOCUMENTS

| | | | |
|---|---|---|---|
| 4,947,461 A | * | 8/1990 | Yoshioka et al. ........... 200/5 R |
| 5,621,196 A | * | 4/1997 | Nishijima et al. .......... 200/6 A |
| 5,912,612 A | * | 6/1999 | DeVolpi ...................... 338/95 |
| 6,080,941 A | * | 6/2000 | Yokobori ..................... 200/6 A |
| 6,246,019 B1 | * | 6/2001 | Nakamura et al. .......... 200/6 A |
| 2001/0025777 A1 | * | 10/2001 | Kashino ..................... 200/512 |

FOREIGN PATENT DOCUMENTS

JP    2000-243188    *    8/2000

* cited by examiner

Primary Examiner—Richard Hjerpe
Assistant Examiner—Jennifer T. Nguyen
(74) Attorney, Agent, or Firm—Rader, Fishman & Grauer PLLC

(57) ABSTRACT

A key input device in which an input key is oscillated with respect to an opposing surface facing a bottom portion thereof and in which depression of the opposing surface with the input key at a normal operating point situated above a contact portion of a board causes the input key to tilt in a normal oscillating direction to effect input at the contact portion. Either the bottom portion of the input key or the opposing surface is equipped with guide protrusions arranged symmetrically with respect to an imaginary line extending along the normal oscillating direction of the input key. Depression of the opposing surface with the input key at an erroneous operating point deviated from the normal operating point results in the guide protrusions guiding the input key to tilt in the normal oscillating direction while abutting either the bottom portion of the input key or the opposing surface.

19 Claims, 12 Drawing Sheets

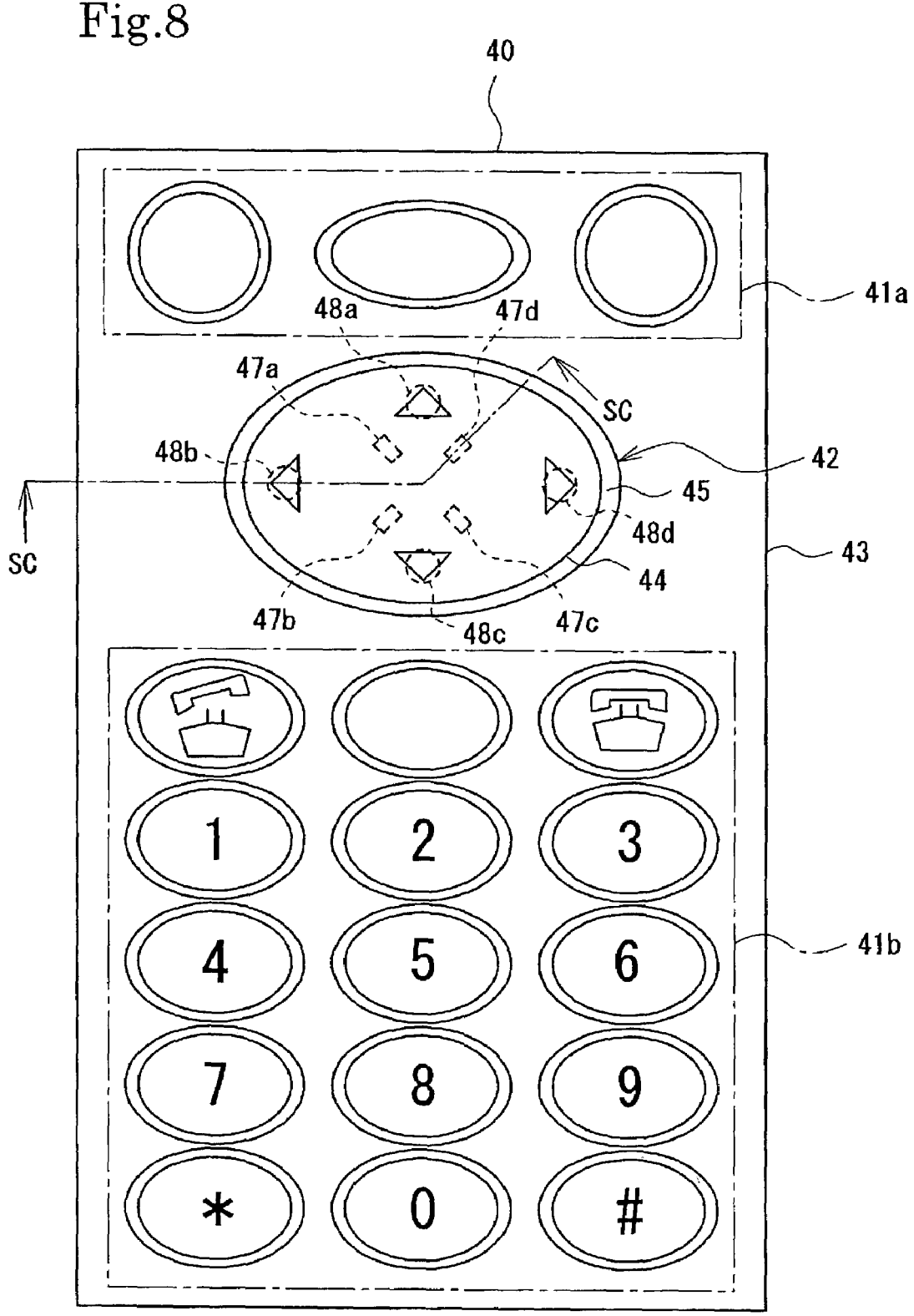

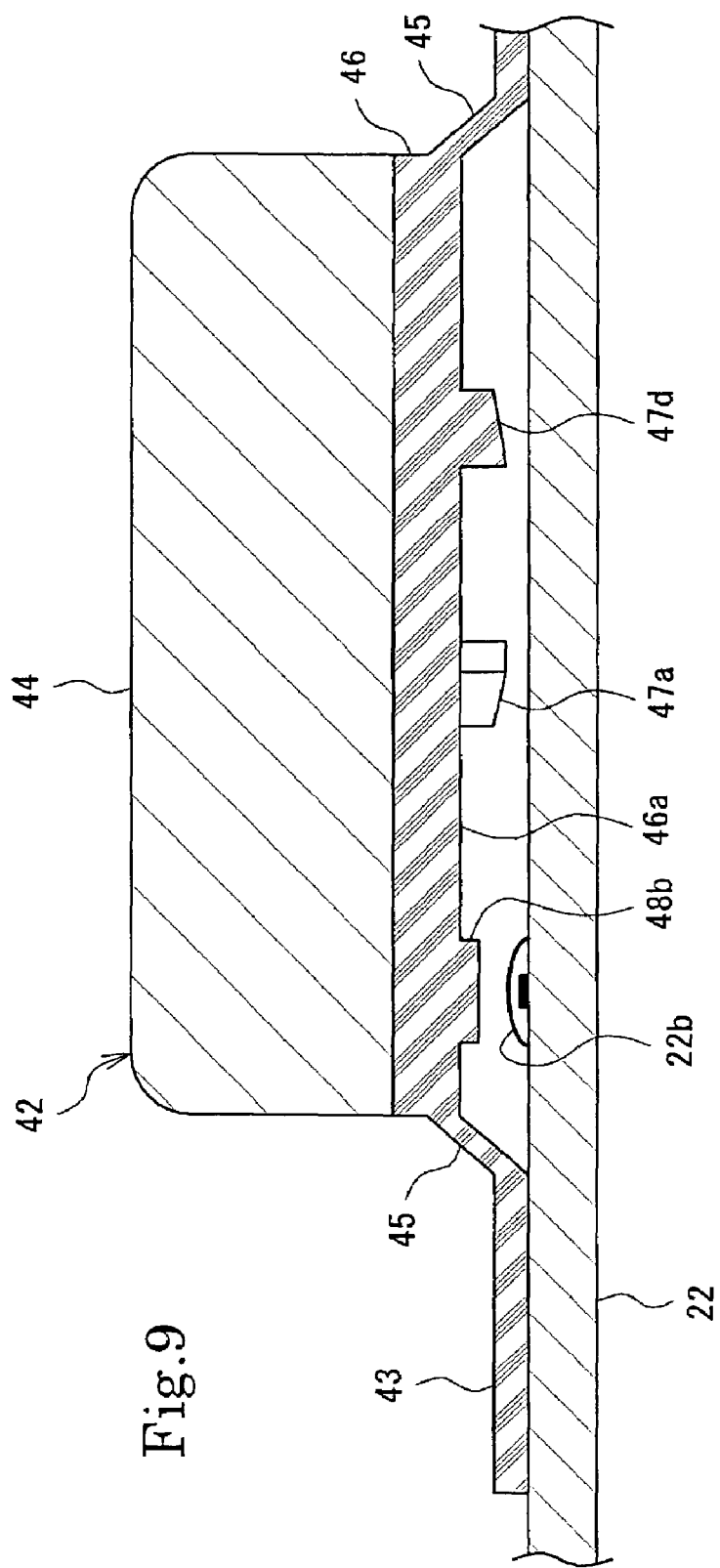

KEY INPUT DEVICE

BACKGROUND OF THE INVENTION

1. Field of the Invention

The present invention relates to a key input device equipped with an input key for a pushbutton switch for the input operation of an electronic apparatus, e.g., a portable information terminal, such as a mobile telephone or PDA, an AV apparatus, a car navigation system, and a remote controller for various apparatuses.

2. Description of the Related Art

An electronic apparatus is equipped with a number of input keys for executing the functions thereof. Recently, with the advent of multifunction apparatuses, it has now become quite a common practice to provide an apparatus with a key input device in which a single input key is used for a number of different input purposes.

As an example of an apparatus equipped with such a key input device, FIG. 14 shows a mobile telephone 1. This mobile telephone 1 is equipped with an input key group 2 with numerals, symbols, patterns, etc. Above the input key group 2, there is provided an input key 3 of an elliptical flat configuration having upper, lower, right, and left triangular symbols. This input key 3 is generally called a multi-point input key or a multi-directional input key and has a pressurizing operation surface 4 with triangular symbols 4a. By appropriately depressing one of these triangular symbols 4a of the pressurizing operation surface 4, it is possible to select from items displayed on a display screen 5, and to move a cursor on the display screen 5 up and down and to the right and left. Of course, under the input key 3 making these operations possible, there are provided, under the triangular symbols 4a, a printed circuit board (not shown) and contact portions thereof. When one of the triangular symbols 4a is depressed, the input key 3 oscillates so as to be tilted (sink) by a predetermined amount to bring the contact portion of the printed circuit board into conduction, whereby the circuit board is closed to realize the operations as described above.

This input key 3 enabling multiple operations as described above, which advantageously allows an apparatus incorporating it to meet the mutually contradictory requirements of multifunctionality and space saving, is widely used not only in the mobile telephone 1 as shown but also in various apparatuses. However, in actuality, it does not always provide satisfactory results in terms of operability.

For example, in the above-described input key 3, as long as each triangular symbol 4a is correctly depressed, it is possible to bring the corresponding contact portion of the printed circuit board into conduction. However, if it is depressed at an erroneous operating point deviated therefrom, the contact portions corresponding to adjacent, other triangular symbols 4a will also be brought into conduction. Such duplex input will necessitate re-input or lead to malfunction of the mobile telephone 1.

This problem in operability is experienced not only with the input key 3 called a multi-point input key having a plurality of operating points (triangular symbols 4a), but also with an input key called a seesaw key having only two operating points on a rectangular or elliptical depressing operation surface and an input key called a mono-directional key having only one operating point on a rectangular or elliptical depressing operation surface. That is, there are cases where the contact portion of the printed circuit board is not brought into conduction even when the operator believes that he has depressed the operating point.

SUMMARY OF THE INVENTION

The present invention has been made in view of the above problem in the prior art. It is accordingly an object of the present invention to provide a key input device with superior operability which helps to realize correct input even when an erroneous operating point deviated from the normal operating point has been depressed.

In order to attain the above-mentioned object, according to the present invention, there is provided a key input device in which an input key can be oscillated with respect to an opposing surface facing a bottom portion thereof and in which depression of the opposing surface with the input key at a normal operating point situated above a contact portion of a board causes the input key to be tilted in a normal oscillating direction to effect input at the contact portion, characterized in that one of the bottom portion of the input key and the opposing surface is equipped with guide protrusions arranged symmetrically with respect to an imaginary line extending along the normal oscillating direction of the input key, and that depression of the opposing surface with the input key at an erroneous operating point deviated from the normal operating point results in the guide protrusions guiding the input key so as to be tilted in the normal oscillating direction while abutting one of the bottom portion of the input key and the opposing surface.

In accordance with this invention, one of the bottom portion of the input key and the opposing surface is provided with guide protrusions arranged symmetrically with respect to an imaginary line extending along the normal oscillating direction of the input key. Thus, even when the opposing surface is depressed with the input key at an erroneous operating point deviated from the normal operating point, the guide protrusions guide the input key so as to be tilted in the normal oscillating direction while abutting with the bottom portion of the input key or the opposing surface. Accordingly, as in the case in which the input key is depressed as the normal operating point, the input key is guided so as to be tilted in the normal oscillating direction during the oscillation process, whereby input is correctly effected through the contact portion of the circuit board. Thus, it is possible to achieve a satisfactory operability for key input.

Note that the term "opposing surface" as used herein implies a planar element opposed to the bottom portion of the input key. More specifically, for example, in the case in which the bottom portion of the input key faces a printed circuit board consisting of insulating hard resin with metal circuit wiring, the upper surface thereof constitutes the "opposing surface". In the case in which the bottom portion of the input key faces a membrane switch, the upper surface of the upper flexible resin film constitutes the "opposing surface". And, the operability in key input can be made satisfactory as stated above also if the guide protrusions are provided on this opposing surface instead of being provided on the bottom portion of the input key.

The key input device may have a structure in which the abutting portion of the guide protrusions is formed as a downwardly sloped surface.

In this invention, the abutting portion of the guide protrusions is formed as a downwardly inclined surface, so that the tilting in the oscillating direction can be effected smoothly, and the operability can be made satisfactory also in terms of operating feel.

The key input device may have a structure in which a fulcrum protrusion serving as an oscillation fulcrum for the input key is formed on one of the bottom portion of the input key and the opposing surface.

In this invention, due to the formation of the fulcrum protrusion, it is possible to reliably support the input key to be depressed, making it possible to oscillate it smoothly.

And, as a form of the key input device equipped with this fulcrum protrusion, the present invention provides a key input device in which the guide protrusions are formed integrally with the fulcrum protrusion.

In this construction of the invention, in which the guide protrusions are formed integrally with the fulcrum protrusion serving as the oscillation fulcrum for the input key, even if the opposing surface is depressed with the input key at an erroneous operating point deviated from the normal operating point, it is possible, immediately after the oscillation start, to guide the input key so as to be inclined in the normal oscillating direction. Further, since it is possible to quickly transfer the pressurizing force due to the depressing operation from the fulcrum protrusion to the guide protrusions, the durability of the fulcrum protrusion is also improved, thus providing a key input device suitable, in particular, for an apparatus frequently subjected to depressing operation.

Further, as another form of the key input device equipped with a fulcrum protrusion, the present invention provides a key input device in which the guide protrusions are spaced apart from the fulcrum protrusion.

This construction of the invention, in which the fulcrum protrusion is spaced part from the guide protrusions, proves particularly effective, for example, in a case in which the requisite oscillation stroke (depression amount) of the input key between the depression start and the conduction of the contact portion is relatively long. That is, when the oscillation stroke of the input key is long, the contact portion can be brought into conduction more correctly if the input key is guided by the guide protrusions so as to be inclined in the normal oscillating direction at a point in time when the input key has been oscillated to some degree since the oscillation start, in other words, at a position nearer to the contact portion.

The key input device may have a structure in which the input key is a multi-point input key having a plurality of normal operating points that are annularly arranged.

In accordance with this invention, input can be effected at each operating point even in the case of a multi-point input key in which normal operating points are arranged in an annular fashion.

The key input device may have a structure in which a guide protrusion is provided in a radial imaginary line extending from a central point of the input key so as to divide into two the interval between adjacent normal operating points.

In accordance with this invention, the guide protrusions are provided in a radial imaginary line extending from the central point of the input key so as to divide the interval between adjacent normal operating points into two, so that there is no need to form an individual guide protrusion for each normal operating point since one guide protrusion can serve adjacent normal operating points.

And, an input key to which the above-described key input device is applicable can be formed as a film key sheet in which a key top main body of resin is formed on the back side of a resin film whose front side constitutes the operation surface. As another example of this input key can be formed as a key pad in which a key top main body of hard resin is joined to a key sheet of soft resin. And, as a more specific example of an input key to be realized by the film-integrated-type resin key top and the keypad, it is possible, for example, to provide an input key called a seesaw key with only two operating points on a rectangular or elliptical depressing operation surface, or an input key called a mono-directional key with only one operating point on a rectangular or elliptical depressing operation surface, to which the key input device of the present invention described above is also applicable.

The above description of this invention should not be construed restrictively. The objectives, advantages, features, and uses of this invention will become more apparent from the following description given with reference to the accompanying drawings. Further, it is to be understood that various modifications, which are made without departing from the gist of this invention fall within the scope of the invention.

BRIEF DESCRIPTION OF THE DRAWINGS

In the accompanying drawings:

FIGS. 4A through 4D are diagrams illustrating the operation of the multi-point input key, of which FIG. 4A is a plan view of the multi-point input key, FIG. 4B is a sectional view taken along the line SA—SA of FIG. 4A showing the multi-point input key when it is not operated, FIG. 4C is a sectional view equivalent to FIG. 4B showing how the key is tilted when an erroneous operating point P is depressed, and FIG. 4D is a sectional view equivalent to FIG. 4B showing how the key is tilted in the normal oscillating direction;

FIG. 8 is a plan view of a key pad to which a third embodiment of the present invention is applied;

FIG. 9 is a sectional view taken along the line SC—SC of FIG. 8;

FIGS. 10A through 10C are diagrams showing a multi-point input key according to a fourth embodiment of the present invention, of which FIG. 10A is a plan view thereof, FIG. 10B is a sectional view taken along the line SD—SD of FIG. 10A, and FIG. 10C is a bottom view thereof;

DESCRIPTION OF THE PREFERRED EMBODIMENTS

Figure 1:
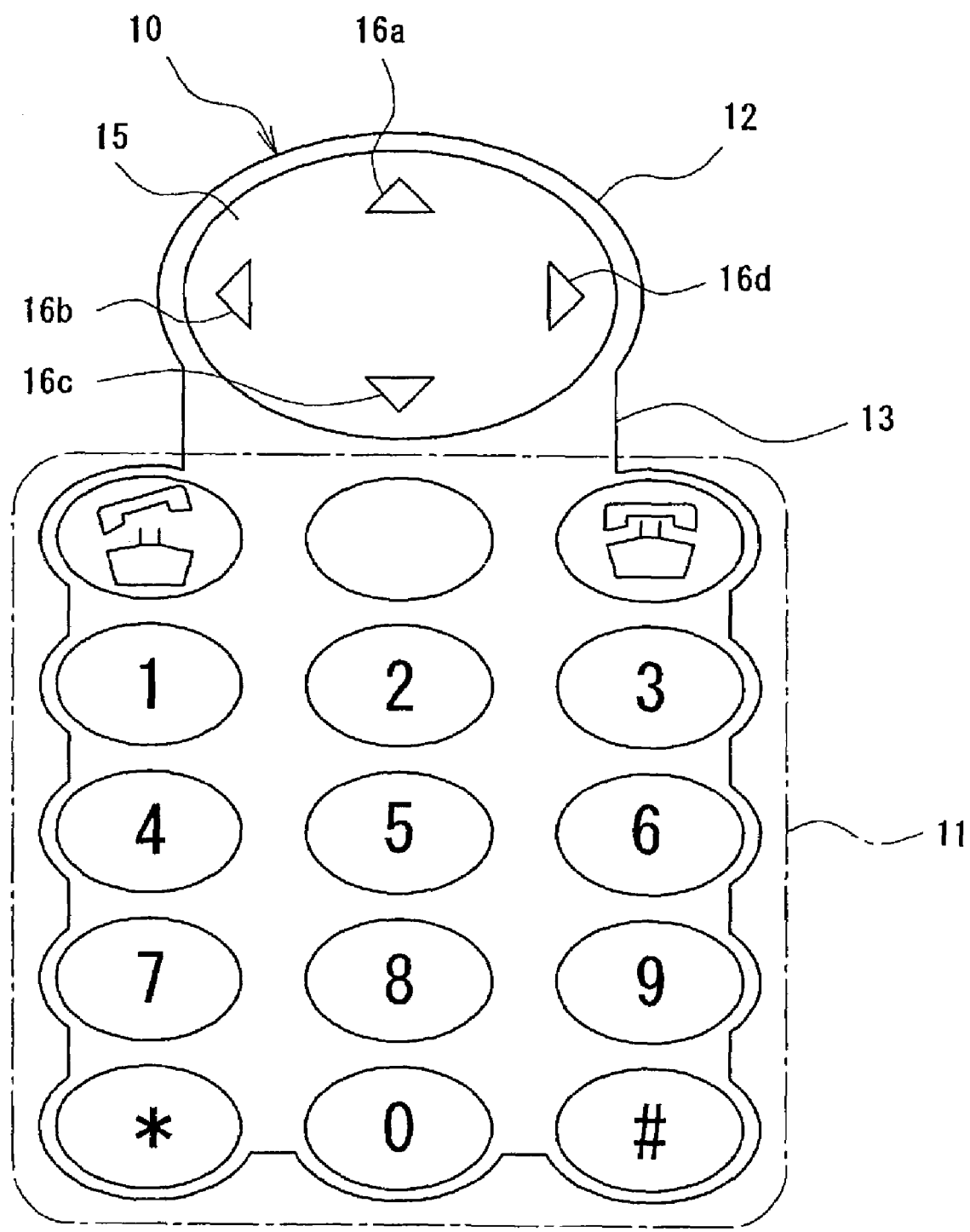
FIG. 1 is a plan view of a key pad to which a first embodiment of the present invention is applied.

Embodiments of the present invention will now be described with reference to the drawings. While the embodiments described below are applied to a mobile telephone, they are also applicable to the input key of an input push-button switch for other electronic apparatuses, such as a portable information terminal like PDA, an AV apparatus, a car navigation system, and a remote controller for various apparatuses. Further, the portions common to the following embodiments are indicated by the same reference numerals, and a redundant description will be omitted.

First Embodiment (FIGS. 1 through 5)

FIG. 1 shows a film key sheet 10 which can be mounted to the above-described mobile telephone 1. An input key group 11 and a multi-point input key 12 are formed on this film key sheet 10. The key input device of the present invention is applied to the multi-point input key 12. The method of manufacturing this film key sheet 10 will be schematically described. First, a protrusion of a configuration corresponding to the input key group 11 and the multi-point input key 12 is formed by performing drawing on a resin film with a molding die. Next, this resin film is placed in an injection molding die, and liquid resin obtained by melting a thermoplastic resin etc. is poured into the inner space of each protrusion and is cured, whereby a key top main body integrated with the resin film is formed. Thus, the multi-point input key 12 is formed as a film-integrated-type resin key top in which a key top main body 14 (See FIG. 2) is formed on the back side of a flexible resin film 13.

The multi-point input key 12 has a depressing operation surface 15 with upper, lower, right, and left triangular symbols 16a, 16b, 16c, and 16d serving as the "normal operating points." These triangular symbols 16a through 16d are formed by printing on the resin film. The figures and symbols of the input key group 11 are also formed by printing on the resin film.

Figure 2:
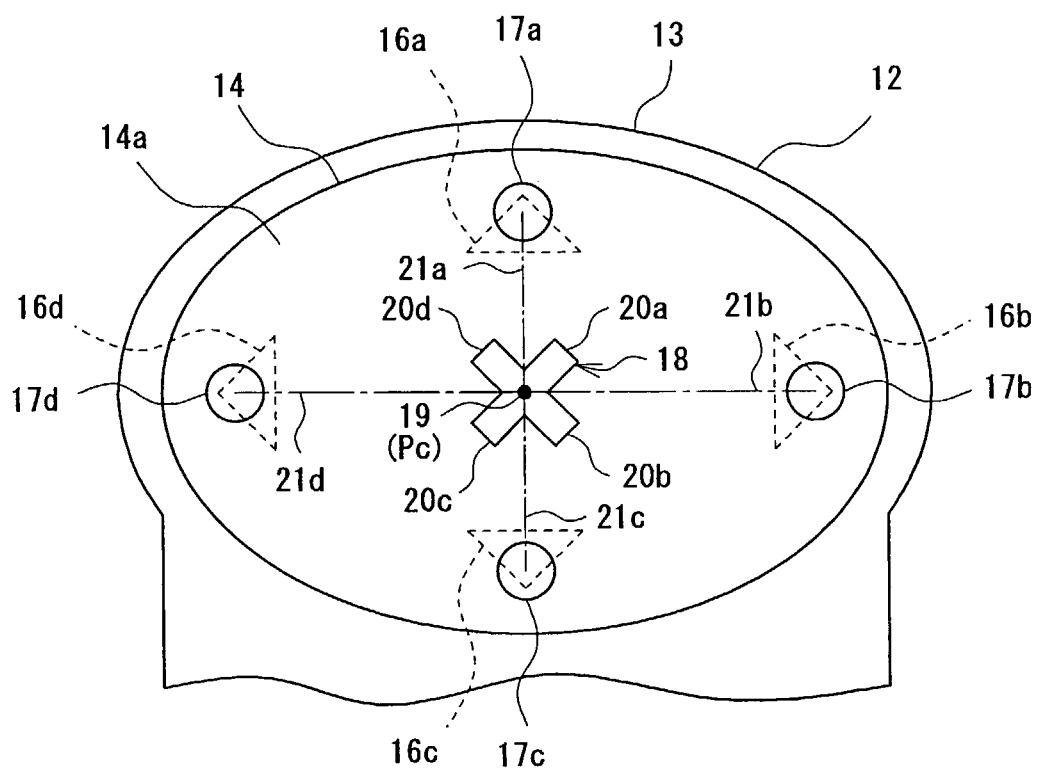
FIG. 2 is an enlarged partial view of the back side of the multi-point input key indicated by the alternate long and short dashed lines in FIG. 1.
Figure 3:
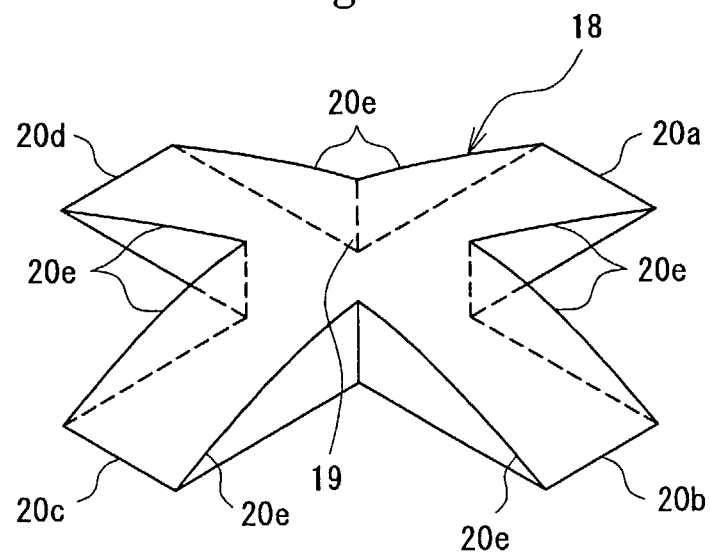
FIG. 3 is an enlarged outside perspective view of an appearance of the oscillation guides (fulcrum protrusion and guide protrusions) shown in FIG. 2.

As shown in FIGS. 2 and 4, on the bottom portion 14a of the key top main body 14 (the multi-point input key 12), there are formed downwardly directed push members 17a, 17b, 17c, and 17d in correspondence with the triangular symbols 16a through 16d. Further, as shown in FIGS. 2 and 3, substantially at the center of the bottom portion 14a corresponding to the center of the depressing operation surface 15, there is formed an X-shaped, downwardly protruding oscillation guide 18. This oscillation guide 18 constitutes the main feature of this embodiment. Its most protrusive, central portion is formed as a fulcrum protrusion 19 oscillatably supporting the multi-point input key 12, with the ridge portions radially extending from the fulcrum protrusion 19 constituting guide protrusions 20a through 20d. In this way, the fulcrum protrusion 19 and the guide protrusions 20a through 20d are integrated as the oscillation guide 18, so that, even if an erroneous operating point deviated from the normal operating point is depressed, it is possible for the multi-point input key 12 to be guided so as to be tilted in the normal oscillating direction in the same manner as in the case in which depression is effected at the normal operating points (16a through 16d). Further, since the pressurizing force applied at the time of depressing operation can be transferred from the fulcrum protrusion 19 to the guide protrusions 20a through 20d, the durability of the fulcrum protrusion 19 is also improved, thus providing a key input device particularly suitable for the mobile telephone 1, on which depressing operation is frequently conducted.

As shown in FIG. 3, the guide protrusions 20a through 20d are formed as gently curved slopes extending from the base end on the fulcrum protrusion 19 side in contact with the printed circuit board to their respective distal ends, making it possible to effect the tilting of the multi-point input key 12 smoothly to thereby achieve an improvement also in terms of operating feel. Further, the guide protrusions 20a through 20d have the same longitudinal length, and exhibit the same amount of protrusion from the bottom surface 14a at each longitudinal position thereof. When the opposing surface facing the guide protrusions 20a through 20d (which, in this embodiment, is the surface of the printed circuit board) exhibits differences in height, it is possible to impart differences in protrusion amount to the guide protrusions 20a through 20d in correspondence therewith. And, when the multi-point input key 12 is depressed at an erroneous operating point, the longitudinally extending edge portions 20e of the respective guide protrusions 20a through 20d come into contact with the printed circuit board, causing the multi-point input key 12 to be guided so as to be inclined in the normal oscillating direction using the edge portions 20e as fulcrums.

Figure 4A:
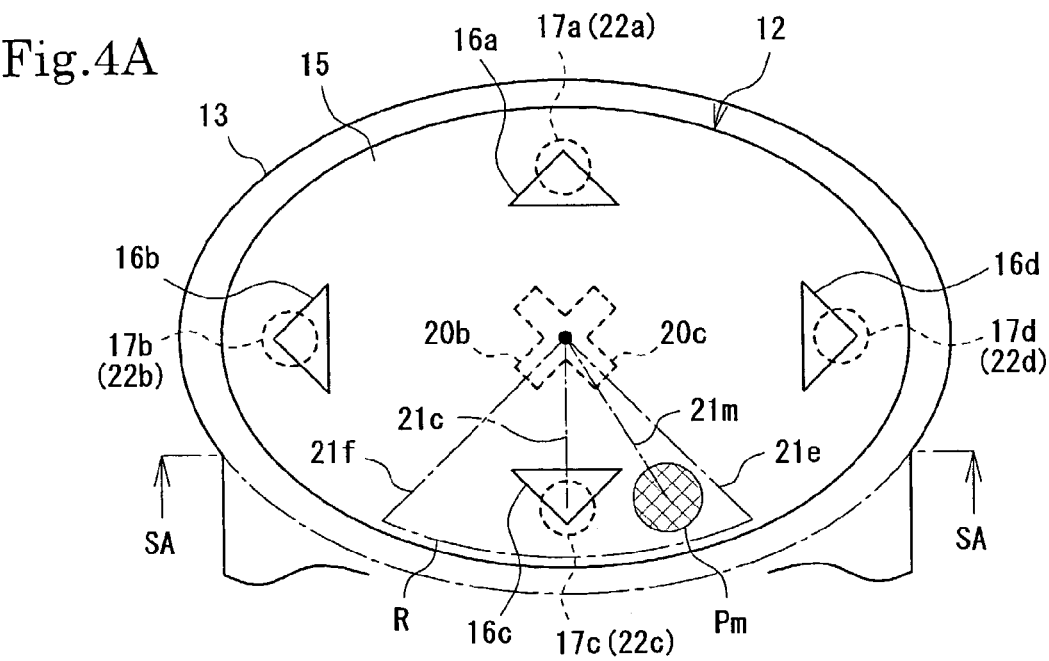
Figure 4B:
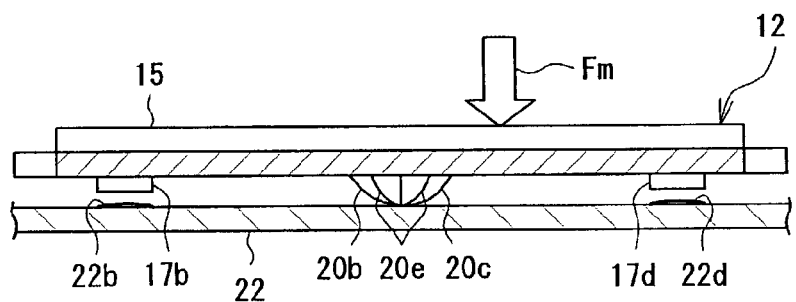

As shown in FIG. 2, the adjacent guide protrusions 20a through 20d are arranged alternately with the normal oscillating directions 21a, 21b, 21c, and 21d, in one of which the multi-point input key 12 is tilted when it is depressed right on the corresponding one of the triangular symbols 16a through 16d indicating the normal operating points. The normal oscillating directions 21a through 21d are indicated by imaginary lines connecting the central point Pc of the fulcrum protrusion 19 with the centers of triangular symbols 16a through 16d or the center of the push members 17a through 17d. Further, as shown in FIG. 4A, the guide protrusions 20a through 20d are formed along imaginary radial lines 21e and 21f extending right between the adjacent ones of the triangular symbols 16a through 16d or of the push members 17a through 17d. Thus, if, for example, an erroneous operating point deviated from the normal operating point indicated by the triangular symbol 16a is depressed, the guide protrusions 20d and 20a function so as to cause the multi-point input key 12 to be tilted in the normal oscillating direction 21a. Similarly, for the triangular symbols 16b, 16c, and 16d, the guide protrusions 20a and 20b, the guide protrusions 20b and 20c, and the guide protrusions 20c and 20d perform the same function, respectively.

Next, an example of the operation of the multi-point input key 12, constructed above, will be illustrated. Under the push members 17a through 17d formed under the triangular symbols 16a through 16d of the multi-point input key 12, there are respectively provided on the printed circuit board 22 contact portions 22a through 22d composed of metal disc springs and board circuits. While, by way of example, the case in which input is effected by depressing the triangular symbol 16c will be described with reference to FIGS. 4A through 4D, the manner of operation to be described also applies to the cases in which input is effected by depressing one of the other triangular symbols 16a, 16b, and 16d.

Figure 4C:
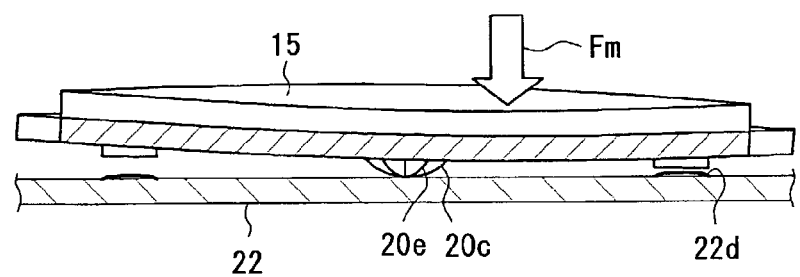
Figure 4D:
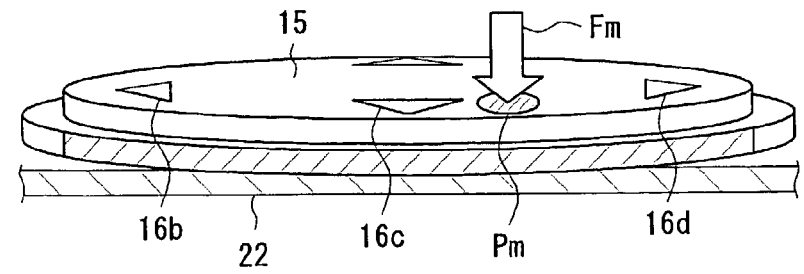

When the multi-point input key is depressed from right above the triangular symbol 16c, input can be effected correctly through the contact portion 22c of the printed circuit board 22, whereas when a pressurizing force Fm is applied to an erroneous operating point Pm deviated from the normal operating point indicated by the triangular symbol 16c (FIGS. 4A and 4B), the multi-point input key 12 will make an attempt to incline in an oscillating direction 21m deviated from the normal oscillating direction 21c, through the fulcrum protrusion 19 of the oscillating guide 18 in contact with the printed circuit board 22. However, in this inclining process, the edge portion 20e of the guide protrusion 20c opposed to the push member 17c comes into contact with the printed circuit board 22, so that the multi-point input key 12 is oscillated so as to be tilted inwardly from the erroneous oscillating direction 21m toward the normal oscillating direction 21c using the edge portion 20e as a fulcrum. And, as shown in FIGS. 4C and 4D, as a result of this oscillation, both the guide protrusions 20b and 20c eventually come into contact with the printed circuit board 22. Thus, even if the erroneous operating point Pm thereon is depressed, the multi-point input key 12 is tilted in the normal oscillating direction 21c. Thus, there is no fear of input being effected simultaneously through the adjacent contact portions 22c and 22d when input ought to be effected solely through the contact portion 22c, or of an input error occurring at the contact portion 22c.

What has been described above is not restricted to the erroneous operating point Pm. Depressing any other point in the sector-shaped area R surrounded by the alternate long and short dashed lines inclusive of the imaginary lines 21e and 21f in FIG. 4A, will cause the edge portion 20e of the guide protrusion 20b or the edge portion 20e of the guide protrusion 20c, opposed to the push member 17c, to come into contact with the printed circuit board 22, making it always possible for the multi-point input key 12 to be tilted in the normal oscillating direction, using the edge portion as a fulcrum.

Figure 5:
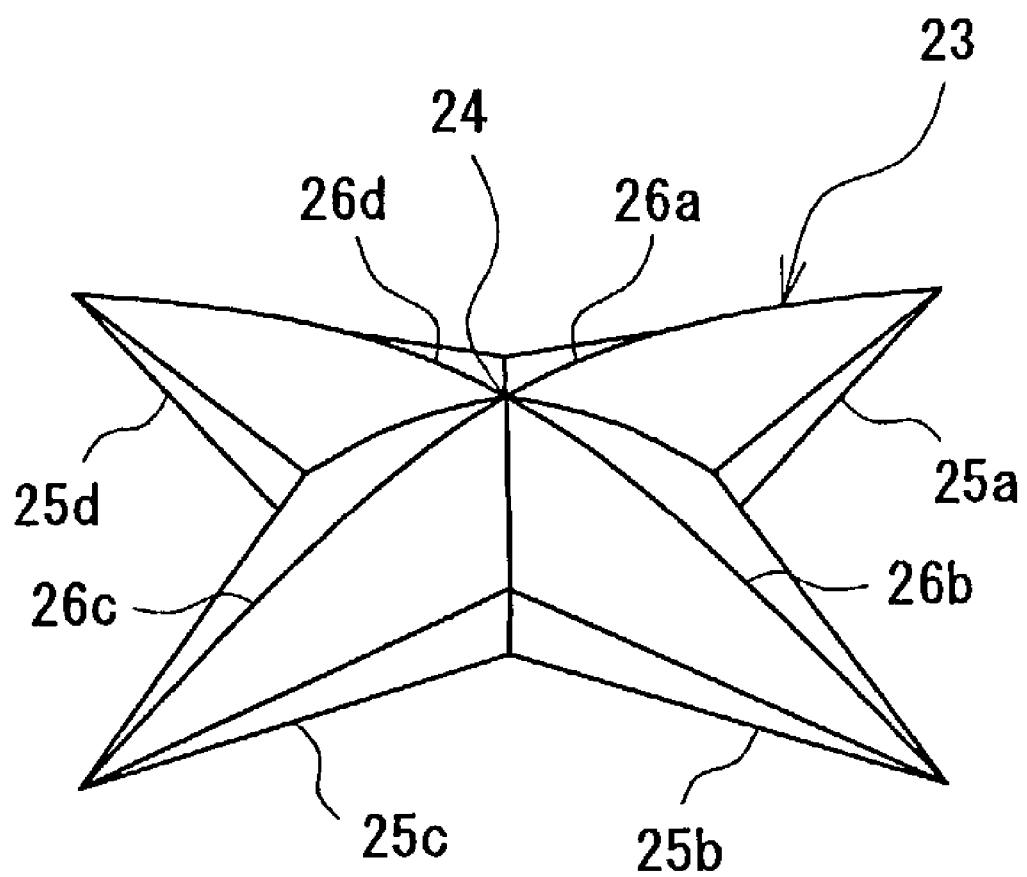
FIG. 5 is an outside perspective view of an appearance of an oscillation guide according to another embodiment of the present invention.

FIG. 5 shows a possible example of a modification of the oscillation guide 18 of the multi-point input key 12 described above. This oscillation guide 23 also has a fulcrum protrusion 24 and guide protrusions 25a through 25d. The guide protrusions 25a through 25d have ridge portions 26a through 26d, respectively, which, like the edge portions of the above-described guide protrusions 20a through 20d, are adapted to come into contact with the printed circuit board 22, enabling the multi-point input key 12 to be tilted in the normal oscillating directions 21a through 21d. Further, the intersection of the ridge portions 26a through 26d constitutes the fulcrum protrusion 24, which is in point contact with the printed circuit board 22, thus oscillatably supporting the multi-point input key 12. Thus, in this oscillation guide 23 with the fulcrum protrusion 24 and the guide protrusions 25a through 25d, the oscillation of the multi-point input key 12 is further facilitated.

Figure 6:
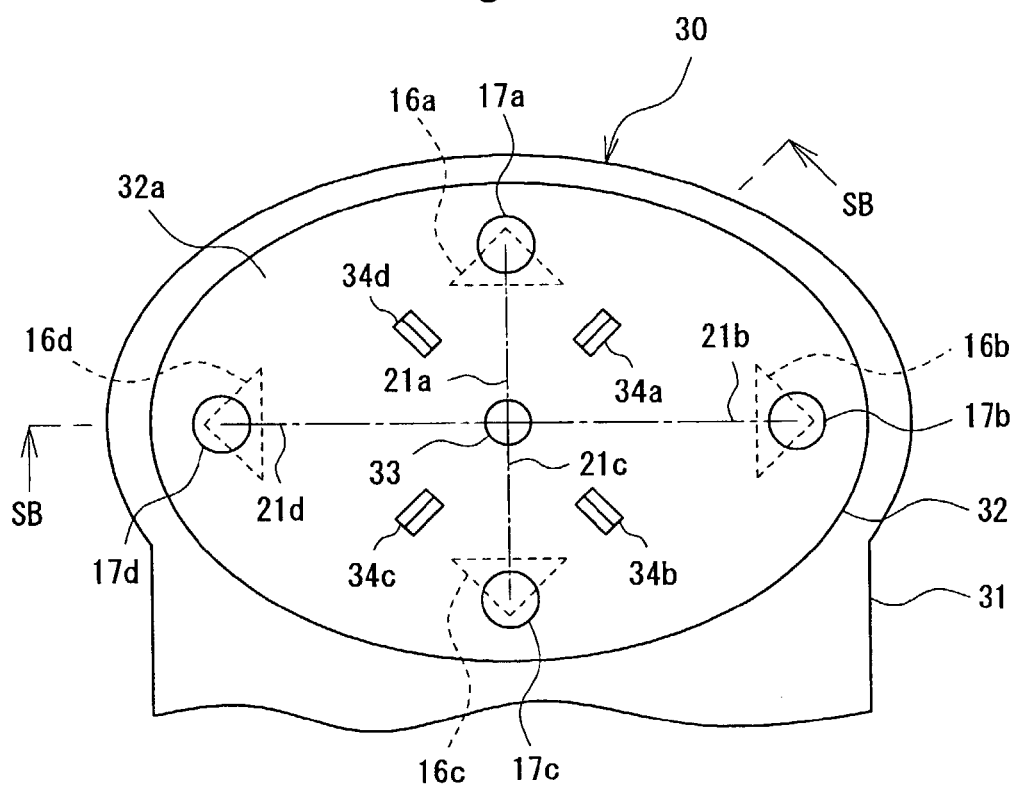
FIG. 6 is a bottom view of a multi-point input key according to a second embodiment of the present invention.
Figure 7:
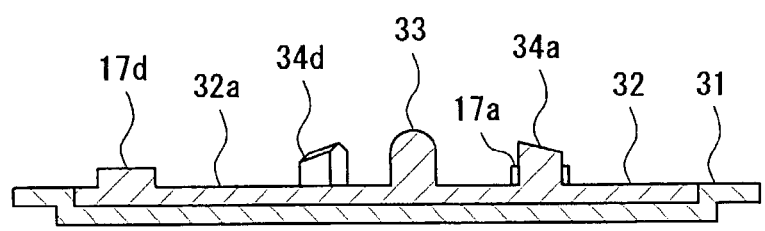
FIG. 7 is a sectional view taken along the line SB—SB of FIG. 6.

Second Embodiment (FIGS. 6 and 7)

FIGS. 6 and 7 show a second embodiment, which, like the first embodiment, is applied to a multi-point input key 30. This multi-point input key 30 is also formed as a film-integrated resin key top formed by integrating a flexible resin film 31 with a key top main body 32 of hard resin. A fulcrum protrusion 33 and guide protrusions 34a through 34d are formed as separate members on a bottom portion 32a of the key top main body 32. This construction makes this multi-point input key different from the multi-point input key 12 of the first embodiment. However, with this construction also, it is possible to achieve the same effect as that of the multi-point input key 12 of the first embodiment. Furthermore, when the requisite oscillation stroke for bringing the contact portions 22a through 22d of the printed circuit board 22 into conduction is long, this construction proves advantageous. For, the guide protrusions 34a through 34d are spaced apart from the fulcrum protrusion 33, so that the multi-point input key 30 is guided so as to be tilted in the normal oscillating directions 21a through 21d at positions nearer to the contact portions 22a through 22d of the printed circuit board 22. Thus, the multi-point input key 30 of this embodiment is advantageous in that it makes it possible to bring the contact portions 22a through 22d of the printed circuit board 22 into conduction more accurately.

Third Embodiment (FIGS. 8 and 9)

FIG. 8 shows a key pad 40 to which a third embodiment of the present invention is applied. The key pad 40 is equipped with input key groups 41a and 41b. Numeral 42 indicates a multi-point input key according to the third embodiment. Instead of being formed as a film-integrated resin key top as in the embodiments described above, this multi-point input key 42 is composed, as shown in FIG. 9, of a key sheet 43 formed of a rubber-like resilient material such as silicone rubber or thermoplastic elastomer and a separate key top main body 44 of hard resin glued thereto with an adhesive or the like. Thus, the key top main body 44 of the multi-point input key 42 is supported by a one-step higher seat portion 46 through the intermediation of a skirt portion 45 of the key sheet 43.

As the above-mentioned structure is employed, in the multi-point input key 42, only guide protrusions 47a through 47d and push members 48a through 48d are formed on a bottom portion 46a of the seat portion 46, and no fulcrum protrusion 19, 24, and 33 as provided in the above-described embodiments is formed. The multi-point input key 42 of this embodiment, in which the key top main body 44 is supported by the seat portion 46 through the intermediation of the skirt portion 45, is capable of oscillation despite the abolition of the fulcrum protrusion. Further, even if an erroneous operating point is depressed, the multi-point input key 42 can be guided so as to be tilted in the normal oscillating direction (21a through 21d) due to the guide protrusions 47a through 47d of the seat portion 46, making it possible to accurately bring the contact portions 22a through 22d of the printed circuit board 22 into conduction through depression.

Figure 10A:
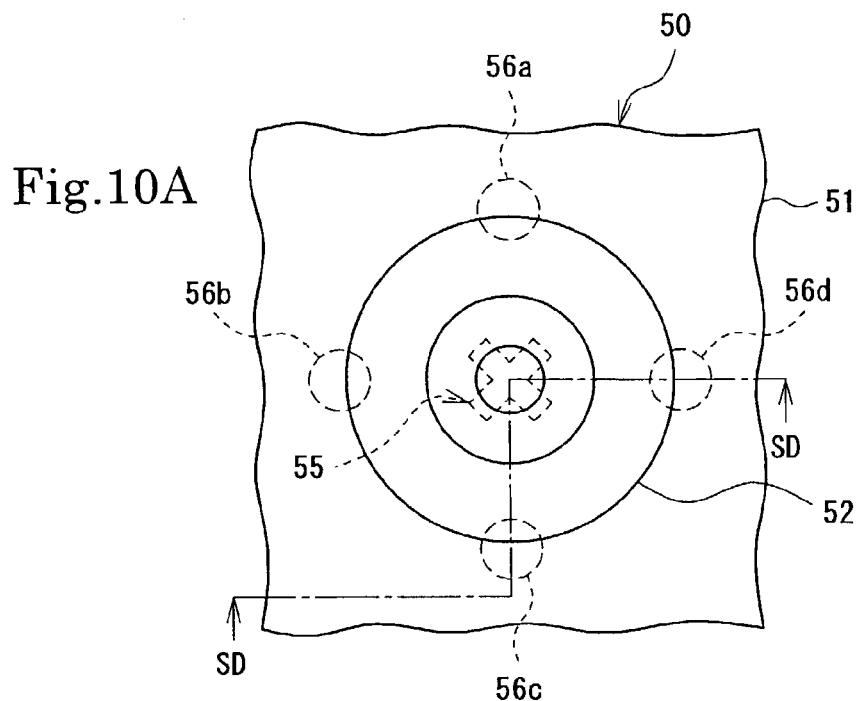
Figure 10B:
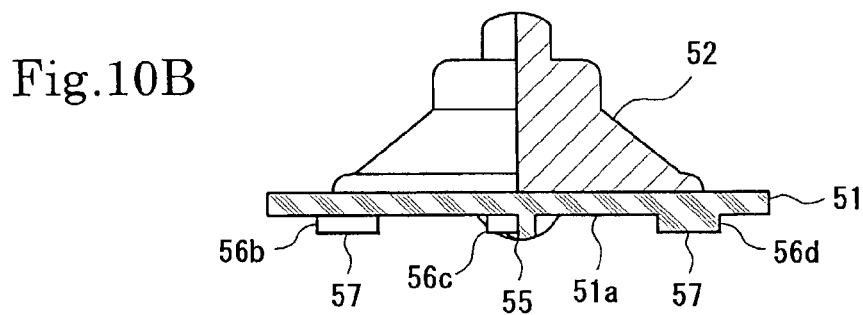
Figure 10C:
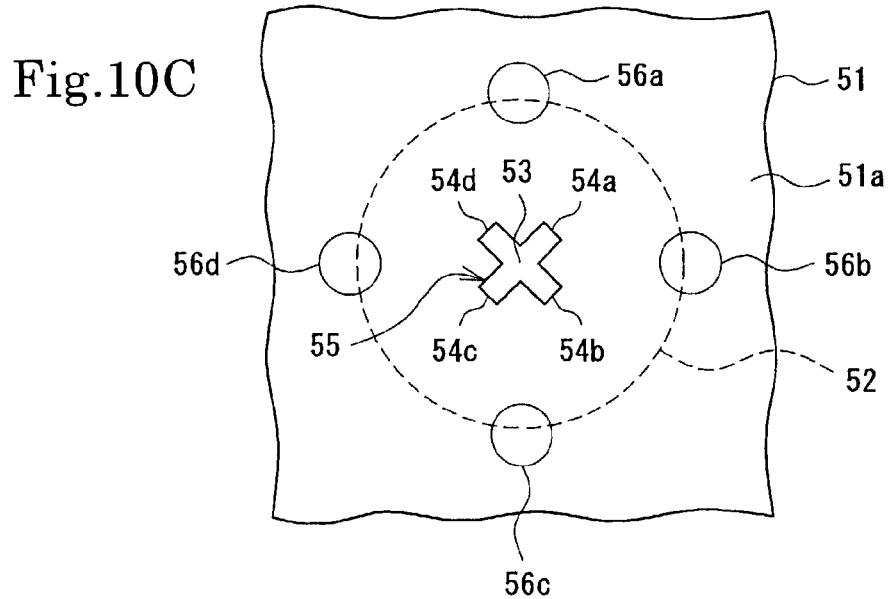

Fourth Embodiment (FIGS. 10A through 10C)

FIGS. 10A through 10C are partial enlarged views of a multi-point input key 50 provided on a key pad. As in the third embodiment, the multi-point input key 50 is formed by joining a key top main body 52 of hard resin to a key sheet 51 of a rubber-like resilient material. As in the first embodiment, an oscillation guide 55 equipped with a fulcrum protrusion 53 and guide protrusions 54a through 54d protrudes downwards from the key sheet 51. Numerals 56a through 56d indicate push members, at the tips of which are provided contact portions 57 with conductive ink applied thereto. Further, the key top main body 52 is of a stick-like configuration, which differs from the flat depressing operation surface 15 of the above-described embodiments. In operating the input key, the key top main body is tilted toward a position directly above each push member 56 (normal operating point) in order that the push member 56 may be moved downwards. Due to its stick-like configuration, the key top main body 52 can be tilted in all directions very easily, so that it is more liable to be tilted in an oscillating direction deviated from the positions directly above the push members 56a through 56d. However, in the multi-point input key 50 of this embodiment, due to the formation of the above-mentioned guide protrusions 54a through 54d, even if operation is performed in such a way as to tilt the key top main body in an erroneous oscillating direction, the key top main body 52 is eventually tilted in the normal oscillating direction, that is, toward the positions directly above the push members 56a through 56d.

Figure 11:
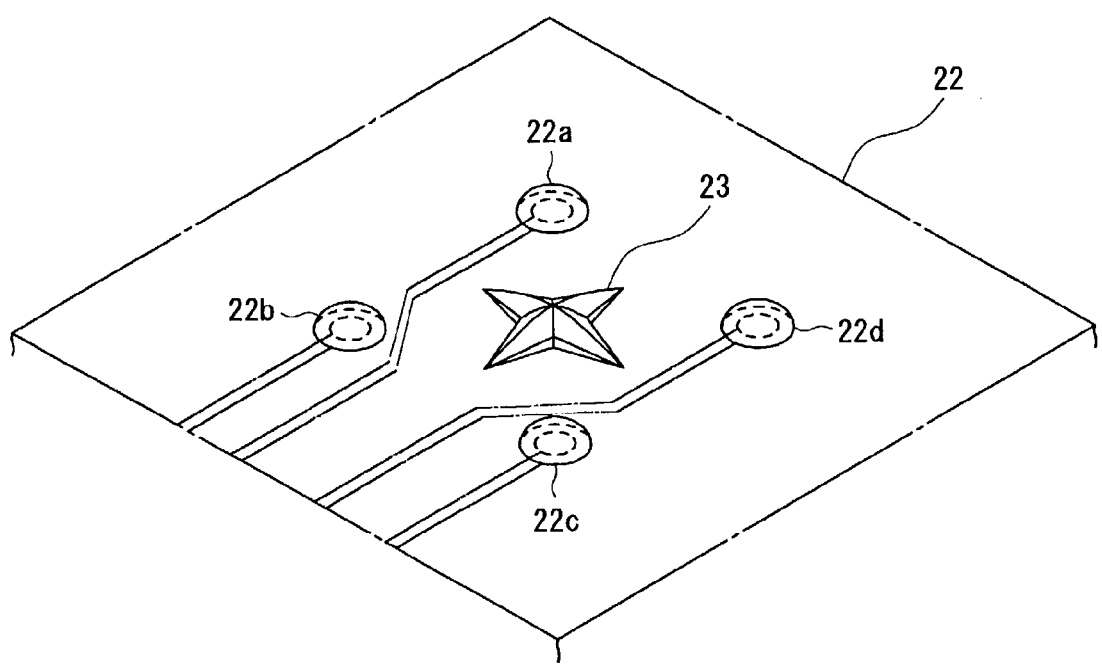
FIG. 11 is an outside perspective view of an appearance of a printed circuit board equipped with an oscillation guide according to still another embodiment of the present invention.
Figure 12:
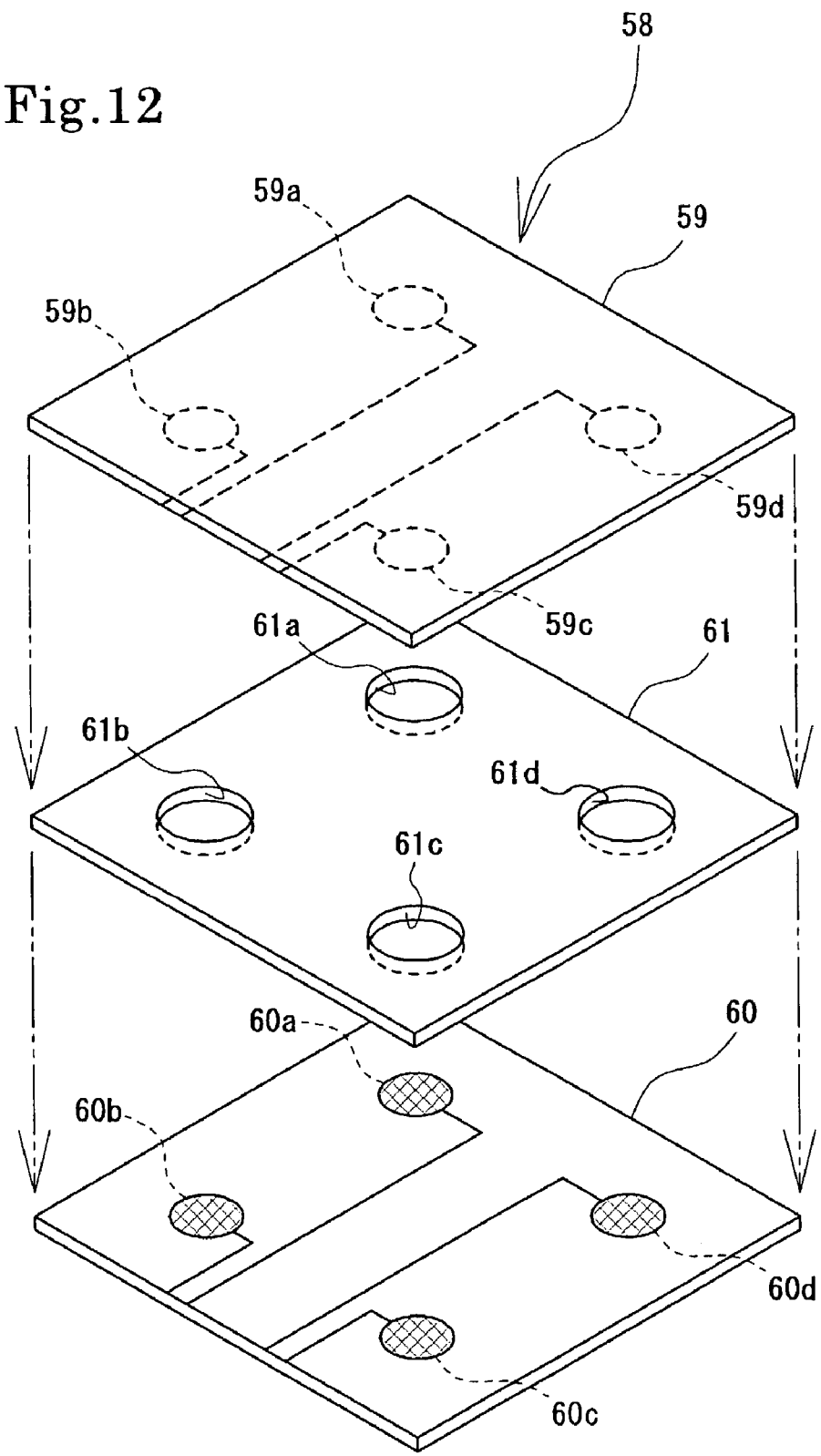
FIG. 12 is an exploded perspective view of a membrane switch.
Figure 13:
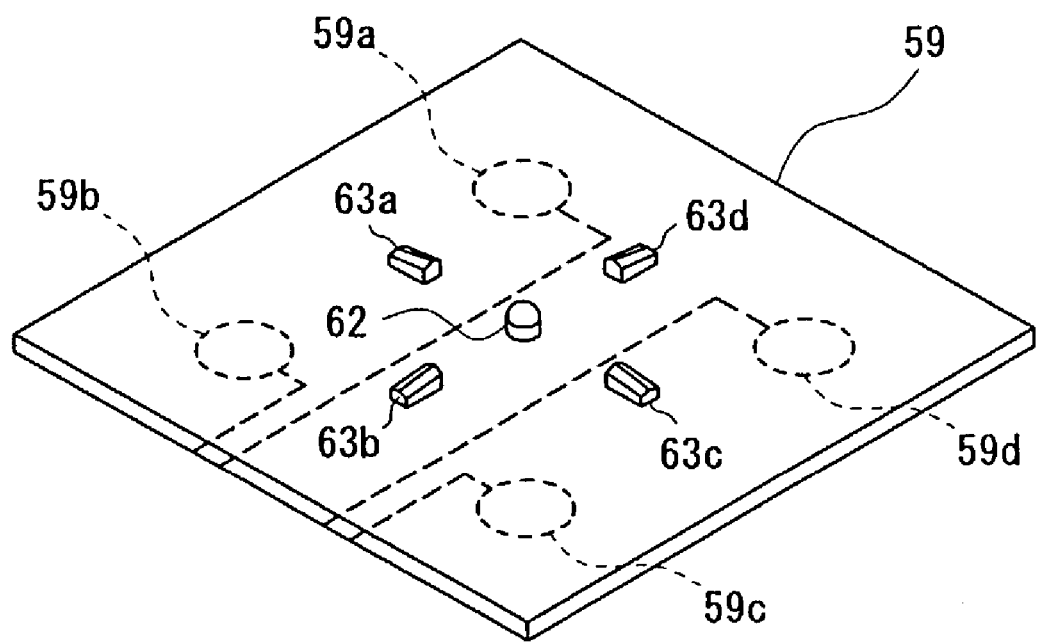
FIG. 13 is an outward perspective view showing an example in which the membrane switch of FIG. 12 is equipped with a fulcrum protrusion and guide protrusions.
Figure 14:
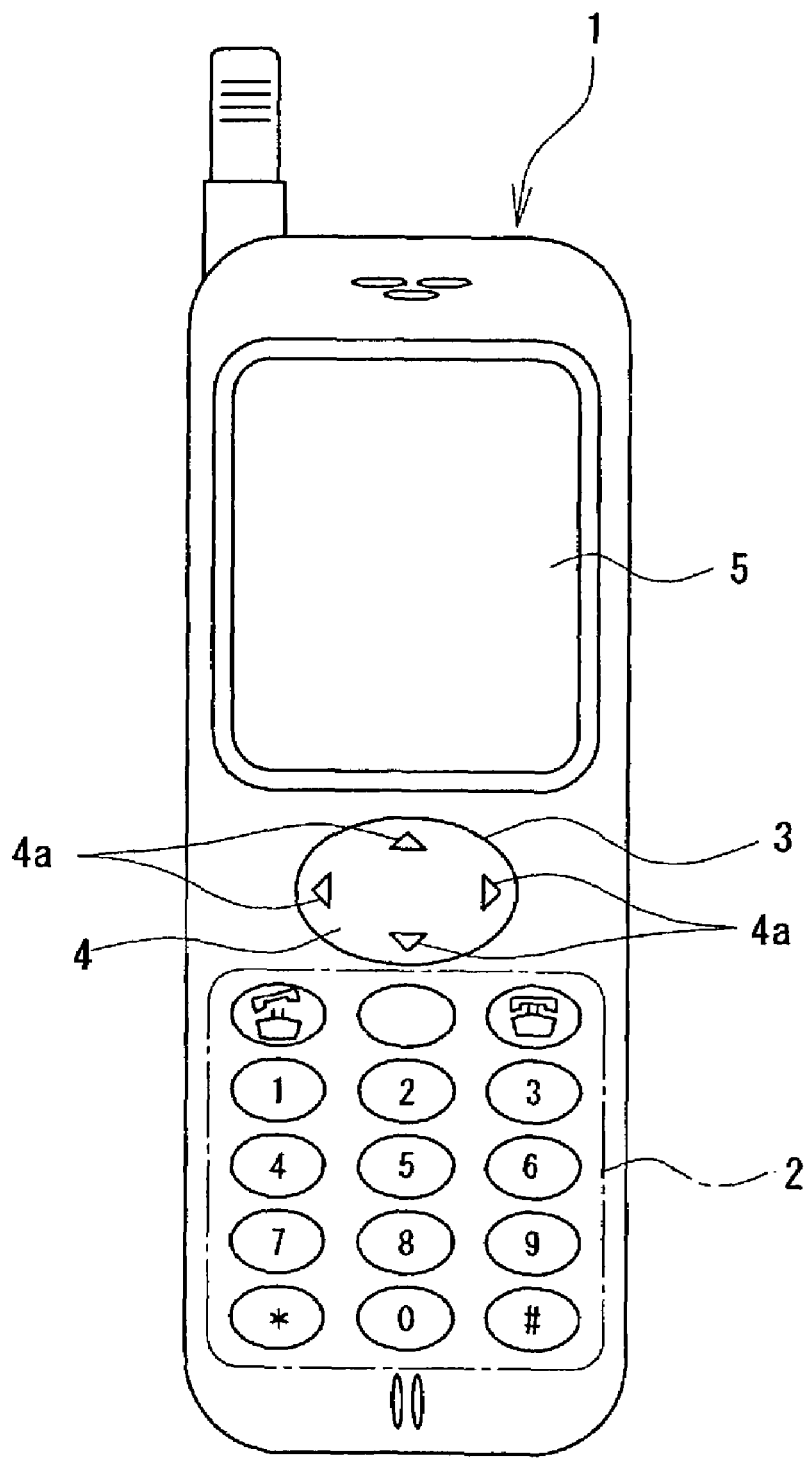
FIG. 14 is an outward front view of a mobile telephone.

Other Embodiments (FIGS. 11 through 13)

While in the above-described embodiments the linear guide protrusions 20a through 20d, 25a through 25d, 34a through 34d, 47a through 47d, and 54a through 54d are used, it is not always necessary for the guide protrusions to be of a continuous configuration. For example, it is also possible to form a plurality of columnar members spaced apart from each other, whose height gradually decreases from the oscillation base end toward the oscillation distal end, and use them as the guide protrusions.

Further, while in the above-described embodiments the multi-point input keys 12, 30, 42, and 50 have four normal operating points, the number of normal operating points maybe larger or smaller than four. And, the guide protrusions maybe formed in correspondence with the number of normal operating points. Further, apart from the elliptical one, the depressing operation surface 15 may also be, for example, of a polygonal or circular configuration.

Further, while in the above-described embodiments the fulcrum protrusions 19, 24, 33, and 53 and the guide protrusions 20a through 20d, 25a through 25d, 34a through 34d, 47a through 47d, and 54a through 54d are formed on the key top main body 14, 32 or the key sheet 43, 51, it is also possible to form them on the printed circuit board 22 constituting the "opposing surface" facing the bottom portions 14a, 32a, 46a, and 51a of the multi-point input keys 12, 30, 42, and 50. FIG. 11 shows an example of such a construction, in which the same oscillation guide 23 formed of thermoplastic resin or the like as shown in FIG. 5 is mounted to a printed circuit board 22 equipped with contact portions 22a through 22d by means of a fixing means such as adhesive or double-faced tape.

While in the above-described embodiments the printed circuit board 22 constitutes the "opposing surface" facing the bottom portion 14a, 32a, 46a, and 51a of the multi-point input key 12, 30, 42, and 50, it is also possible, as shown in FIG. 12, to use a membrane switch 58 instead of the printed circuit board 22. This membrane switch has a basic structure in which upper and lower films 59 and 60 consisting of flexible resin films are stacked together through the intermediation of a spacer 61 consisting of a double-faced tape or the like. Formed on the upper film 59 are upper contacts 59a through 59d, to which conductive ink or the like is applied to cure thereon. Similarly, lower contacts 60a through 60d are formed on the lower film 60. And, when the upper film 59 is pressurized from above the upper contacts 59a through 59d, the upper contacts 59a through 59d come into contact with the lower contacts 60a through 60d through holes 61a through 61d of the spacer 61 to thereby effect input. Thus, the upper contacts 59a through 59d and the lower contacts 60a through 60d correspond to the contact portions 22a through 22d of the printed circuit board 22 of the above embodiments. In the case of this membrane switch 58, the upper surface of the upper film 59 constitutes the "opposing surface." And, as shown in FIG. 13, the fulcrum protrusion 62 and guide protrusions 63a through 63d like those shown in FIG. 6, formed of thermoplastic resin or the like, can be mounted to the upper film 59 of FIG. 12 by a fixing means such as adhesive or double-faced tape.

In the key input device of the present invention, even if an erroneous operating point deviated from the normal operating point is depressed, the input key can be tilted in the normal oscillating direction for correct input, thus providing a satisfactory operability and making it possible to minimize input errors as less as possible.

What is claimed is:

1. A key input device in which an input key can be oscillated with respect to an opposing surface facing a bottom portion thereof and in which depression of the opposing surface with the input key at a normal operating point situated above a contact portion of a board causes the input key to be tilted in a normal oscillating direction to effect input at the contact portion,
   wherein one of the bottom portion of the input key and the opposing surface is equipped with guide protrusions arranged symmetrically with respect to an imaginary line extending along the normal oscillating direction of the input key,
   wherein depression of the opposing surface with the input key at an erroneous operating point deviated from the normal operating point results in the guide protrusions guiding the input key so as to be tilted in from an erroneous oscillating direction to the normal oscillating direction while abutting one of the bottom portion of the input key and the opposing surface, and
   wherein the input key is a film-integrated-type resin key top obtained by forming a key top main body of resin integrally on the back side of a resin film whose front side constitutes a depressing operation surface.

2. A key input device according to claim 1, wherein the abutting portion of the guide protrusions is formed as a downwardly sloped surface.

3. A key input device according to claim 2, wherein a fulcrum protrusion serving as an oscillation fulcrum for the input key is formed on one of the bottom portion of the input key and the opposing surface.

4. A key input device according to claim 3, wherein the input key is a multi-point input key having a plurality of normal operating points that are annularly arranged.

5. A key input device according to claim 4, wherein a guide protrusion is provided in a radial imaginary line extending from a central point of the input key so as to divide into two an interval between adjacent normal operating points.

6. A key input device according to any one of claims 1 to 5, wherein the input key is a key pad formed by joining a key top main body of hard resin to a key sheet of soft resin.

7. A key input device according to claim 2, wherein the input key is a multi-point input key having a plurality of normal operating points that are annularly arranged.

8. A key input device according to claim 7, wherein a guide protrusion is provided in a radial imaginary line extending from a central point of the input key so as to divide into two an interval between adjacent normal operating points.

9. A key input device according to claim 1, wherein a fulcrum protrusion serving as an oscillation fulcrum for the input key is formed on one of the bottom portion of the input key and the opposing surface.

10. A key input device according to claim 9, wherein the input key is a multi-point input key having a plurality of normal operating points that are annularly arranged.

11. A key input device according to claim 10, wherein a guide protrusion is provided in a radial imaginary line extending from a central point of the input key so as to divide into two an interval between adjacent normal operating points.

12. A key input device according to claim 1, wherein the input key is a multi-point input key having a plurality of normal operating points that are annularly arranged.

13. A key input device according to claim 12, wherein a guide protrusion is provided in a radial imaginary line extending from a central point of the input key so as to divide into two an interval between adjacent normal operating points.

14. A key input device in which an input key can be oscillated with respect to an opposing surface facing a bottom portion thereof and in which depression of the opposing surface with the input key at a normal operating point situated above a contact portion of a board causes the input key to be tilted in a normal oscillating directions to effect input at the contact portion,
   wherein the input key is made of a key pad formed by joining a key top material body of hard resin to a key sheet of a rubber-like resilient material,
   wherein the bottom portion of the key sheet made of a rubber-like resilient material is equipped with guide protrusions arranged symmetrically with respect to an imaginary line extending along the normal oscillating direction of the input key, and
   wherein depression of the opposing surface with the input key at an erroneous operating point deviated from the normal operating point results in the guide protrusions guiding the input key so as to be tiled in from an erroneous oscillating direction to the normal oscillating direction while abutting one of the bottom portion of the input key and the opposing surface.

15. A key input device according to claim 14, wherein the abutting portion of the guide protrusions is formed as a downwardly-sloped surface.

16. A key input device according to claim 14, wherein a fulcrum protrusion serving as an oscillation fulcrum for the input key is formed on one of the bottom portion of the input key and the opposing surface.

17. A key input device according to claim 14, wherein the input key is a multi-point input key having a plurality of normal operating points that is annularly arranged.

18. A key input device according to claim 17, wherein a guide protrusion is provided in a radial imaginary line extending from a central point of the input key so as to divide into two an interval between adjacent normal operation points.

19. A key input device according to any one of claims 14 to 18, wherein the input key is a key pad formed by joining a key top main body of hard resin to a key sheet of soft resin.

* * * * *